(12) United States Patent
Lee et al.

(10) Patent No.: US 7,600,171 B2
(45) Date of Patent: *Oct. 6, 2009

(54) METHOD OF CONTROLLING FEC IN EPON

(75) Inventors: Hoon Lee, Daejeon (KR); Tae Whan Yoo, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 641 days.

This patent is subject to a terminal disclaimer.

(21) Appl. No.: 11/005,115

(22) Filed: Dec. 4, 2004

(65) Prior Publication Data

US 2005/0149822 A1 Jul. 7, 2005

(30) Foreign Application Priority Data

Dec. 18, 2003 (KR) .................... 10-2003-0093111
May 11, 2004 (KR) .................... 10-2004-0033066

(51) Int. Cl.
*G06F 11/00* (2006.01)
*H03M 13/00* (2006.01)
*G01R 31/08* (2006.01)
*H04J 3/16* (2006.01)

(52) U.S. Cl. .................. 714/751; 714/48; 370/216; 370/470

(58) Field of Classification Search ........... 370/470, 370/428, 426, 427, 472, 473, 216, 242, 218, 370/352, 395.4, 474, 332, 333, 314, 390; 714/12, 48, 753, 779, 776, 775, 777, 758, 714/4, 18, 20, 750, 757

See application file for complete search history.

(56) References Cited

U.S. PATENT DOCUMENTS

| 5,809,249 | A | 9/1998 | Julyan |
| 5,922,052 | A | 7/1999 | Heaton |
| 6,457,055 | B1 | 9/2002 | Hwong et al. |
| 6,538,994 | B1 | 3/2003 | Horspool et al. |
| 6,823,470 | B2 * | 11/2004 | Smith et al. .................... 714/4 |

(Continued)

FOREIGN PATENT DOCUMENTS

WO    WO 2004/056025 A2 *  1/2004

*Primary Examiner*—Hanh Nguyen
(74) *Attorney, Agent, or Firm*—Blakely, Sokoloff, Taylor & Zafman LLP (57) ABSTRACT

A method of controlling a Forward Error Correction (FEC) operation including: configuring a FEC frame to be transmitted between an OLT and an ONU comprising a FEC frame identifier indicating whether FEC should be performed, data, a first flag indicating that FEC should be performed, and a second flag indicating that the FEC frame is to be FEC encoded; initializing the OLT by disabling a FEC function; determining whether the ONU requires FEC to be performed based on a FEC frame identifier received from the ONU; IPG stretching the FEC frame when the ONU requires to FEC to be performed; and transmitting the FEC frame to the ONU after FEC encoding based on the second flag of an input frame to a PCS sublayer from an upper layer. The method controls an effective operation of a FEC of an ONU and an OLT without changing a Round Trip Time (RTT) according to optical link quality in an EPON. Accordingly, FEC is used only if necessary, thereby simplifying the managing of a link, and preventing an excessive 35% reduction of throughput caused by use of unnecessary FEC.

9 Claims, 9 Drawing Sheets

U.S. PATENT DOCUMENTS 6,829,741 B1 * 12/2004 Khansari et al. ............ 714/755
7,127,167 B2 * 10/2006 Sala et al. .................... 398/72
7,152,199 B2 * 12/2006 Nuyen et al. ................ 714/776
7,343,540 B2 * 3/2008 Khermosh et al. .......... 714/758
7,440,475 B2 * 10/2008 Kubo et al. .................. 370/535

* cited by examiner

S_FEC :/K28.5/D6.4/K28.5/D6.4/S/
T_FEC_E :/T/R/I/T/R/
T_FEC_O :/T/R/I/T/R/

FEC FRAME

FIG. 5 (PRIOR ART)

Discovery Handshake Message Exchange

METHOD OF CONTROLLING FEC IN EPON

This application claims the priority of Korean Patent Application Nos. 2003-93111 and 2004-33066, filed on Dec. 18, 2003, and May 11, 2004, respectively, in the Korean Intellectual Property Office, the disclosures of which are incorporated herein in their entirety by reference.

BACKGROUND OF THE INVENTION

1. Field of the Invention

The present invention relates to a method of controlling Forward Error Correction (FEC) used in an Ethernet based Passive Optical Network (EPON) system.

2. Description of the Related Art

Figure 1:
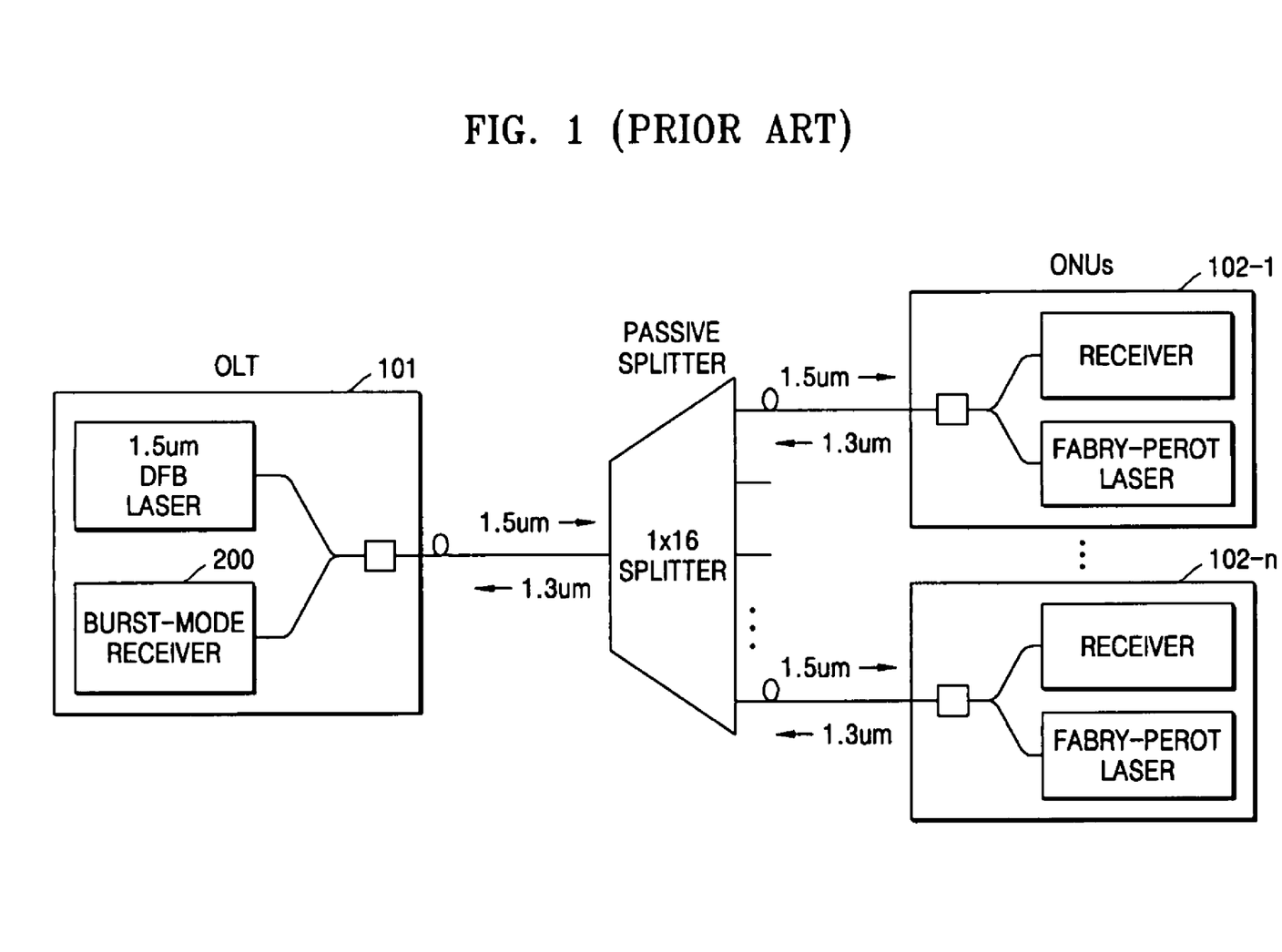
FIG. 1 is a block diagram of a conventional PON.

Referring to FIG. 1, an EPON system performs the role of point-to-multipoint Ethernet link in order to allow communications between an Optical Line Termination (OLT) 101 and one of a plurality of Optical Network Units (ONU) 102-1, ..., 102-n and between one of the ONUs 102-1, ..., 102-n and another one of the ONUs 102-1, ... 102-n in a PON distribution network. The ONUs 102-1, ..., 102-n are connected to OLT 101 through a 1×n splitter.

Transmission from one of ONUs 102-1, ..., 102-n to OLT 101 is referred to as an upstream transmission, and transmission from OLT 101 to one of ONUs 102-1, ..., 102-n is referred to as a downstream transmission. In a PON, an Ethernet frame of a downstream transmission physically has transmission characteristics of broadcast and is received by all of the ONUs 102-1, ..., 102-n.

However, an Ethernet frame of an upstream transmission is incapable of being transmitted from one of ONUs 102-1, ..., 102-n to another one of ONUs 102-1, ..., 102-n.

Due to these PON characteristics, a MultiPoint Control Protocol (MPCP) function that controls a frame transmission time of each one of ONUs 102-1, ..., 102-n is used to prevent collision between frames when a plurality of ONUs 102-1, ..., 102-n transmit Ethernet frames upstream to OLT 101. OLT 101 determines an upstream transmission time available for each of ONUs 102-1, ..., 102-n and informs ONUs 102-1, ..., 102-n of the upstream transmission times, ONUs 102-1, ..., 102-n transmits Ethernet frames upstream to OLT 101 during the designated transmission times determined by OLT 101. Since OLT 101 should know if there is an Ethernet frame to be transmitted upstream from one of ONUs 102-1, ..., 102-n to OLT 101 in order to determine a transmission time, ONUs 102-1, ..., 102-n notify OLT 101 in advance whether there is an Ethernet frame to be transmitted upstream. As such, information for performing upstream TDMA is delivered between OLT 101 and ONUs 102-1, ..., 102-n. In this regard, a Media Access Control (MAC) layer generates and terminates a MPCP MAC control frame having the information for performing the upstream TDMA.

It should be possible for a new ONU to participate in a PON link through a plug & play method. When a new ONU connects to a PON link, variables relating to a PON matching between OLT 101 and the new ONU are exchanged within a prescribed time, automatically resulting in a normal operation state. The operation does not involve a negotiation between OLT 101 and the new ONU. A unilateral exchange of operation variables of OLT 101 and the new ONU results in a normal operation. A MAC control frame is used to exchange relating variables.

Figure 5:
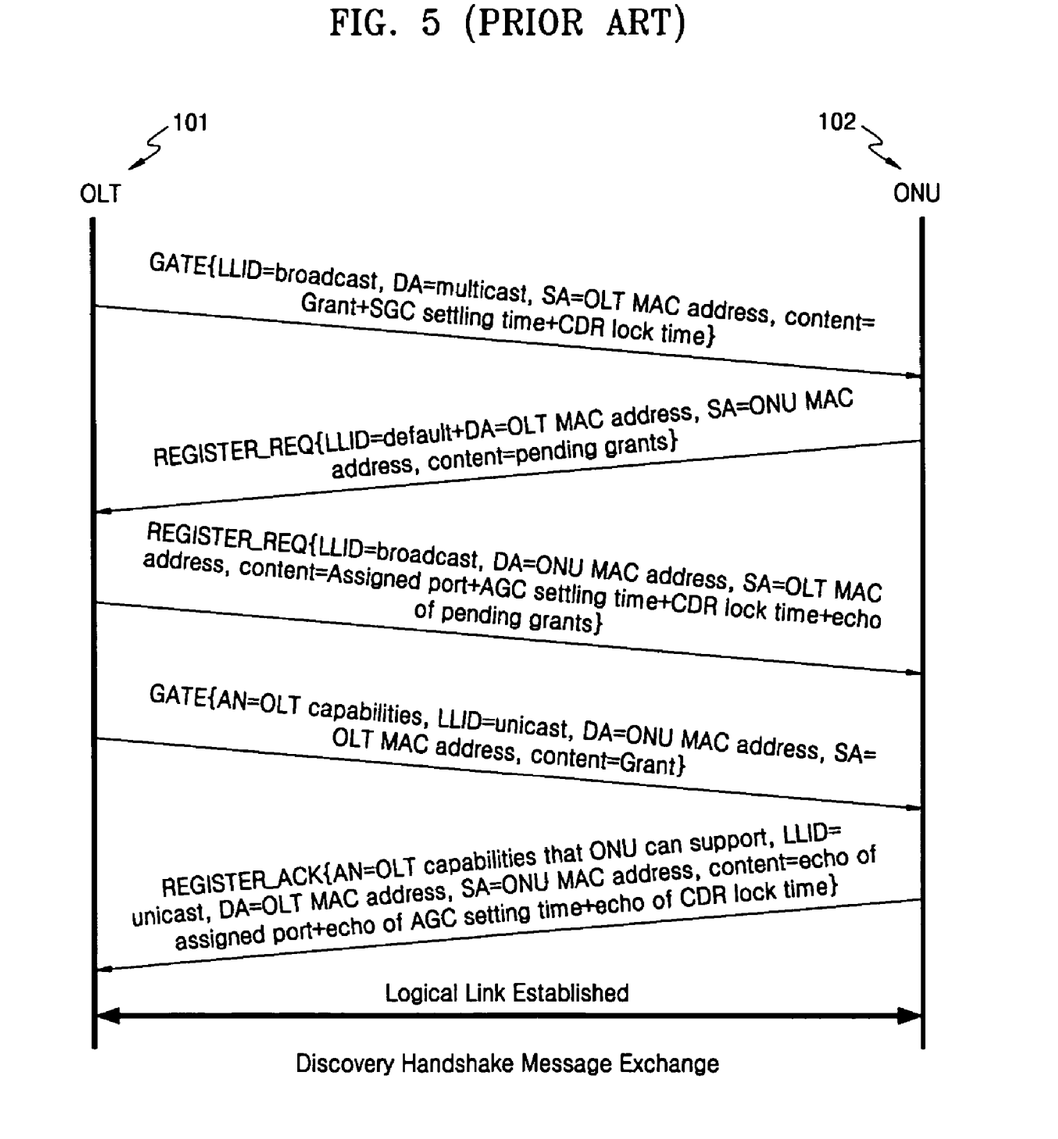
FIG. 5 is a diagram illustrating discovery procedure of a conventional EPON system.

To allow the new ONU to participate in (or register) a PON link is referred to as discovery, which follows a procedure shown in FIG. 5. OLT 101 generates a broadcast gate frame in which a broadcast LLID and a broadcast MAC address are designated and, designates a time slot for one of ONUs 102-1, ..., 102-n to upstream access.

An unregistered ONU receives the frame and acknowledges a time slot to request registration to OLT 101. The time slot is referred to as a discovery window. A plurality of unregistered ONUs can request registration simultaneously during the discovery window, and thus registration requests may collide with each other. When OLT 101 generates a gate designating discovery window, OLT 101 transmits a gate message including capability variables such as operation variables so that the new ONU requesting registration knows a receipt performance of OLT 101. When the new ONU requests registration to OLT 101, the new ONU transmits a message including capability variables such as operation variables.

When request for registration of the new ONU, i.e., a register request frame, is transmitted without collision, OLT 101 establishes a logical link with the new ONU and operation variables relating to the link to OLT 101, and transmits a Logical Link Identification (LLID) to the new ONU. A register MAC control frame is used to transmit a completed register of the new ONU, the LLID, and echo information of operation variables of the new ONU, etc. to the new ONU.

Since the new ONU does not know an LLID that is assigned to the new ONU, a register MAC control frame is transmitted as a broadcast LLID. However, a Destination Address (DA) is designated as a MAC address that is transmitted to OLT 101 when the new ONU makes a register request. The new ONU receives a register frame and acknowledges a normal registration. Thus, when OLT 101 transmits a gate frame, the new ONU transmits a register acknowledge frame using a time slot designated by the gate frame to inform OLT 101 that the normal registration is acknowledged so that both OLT 101 and the new ONU are in a normal operating state.

When a request for registration of the new ONU is erroneously transmitted to OLT 101 due to collision or a link error during a discovery window time, OLT 101 does not generate a register frame, or echo information of operation variables in a register frame of the new ONU is not consistent with the echo information initially transmitted by the new ONU. In this case, it is determined that the new ONU has failed to register. Hence, the new ONU attempts to register again after a proper back-off operation.

Each of ONUs 102-1, ..., 102-n locates at a predetermined distance from OLT 101 in a PON distribution network. When OLT 101 assigns an upstream transmission time to one of ONUs 102-1, ..., 102-n using a TDMA method, it is necessary for the upstream transmission time to be compensated for as much as a Round Trip Time (RTT). Through the compensation, there is no possibility of collision of upstream signals when OLT 101 receives the upstream signals.

Therefore, RTT should be measured to determine the compensation required, which is referred to as ranging.

Figure 2:
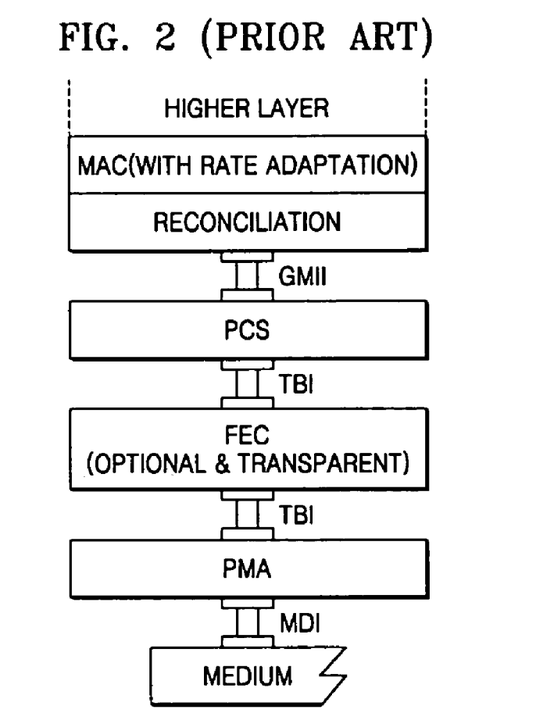
FIG. 2 is a diagram illustrating layers of a conventional EPON system.
Figure 3A:
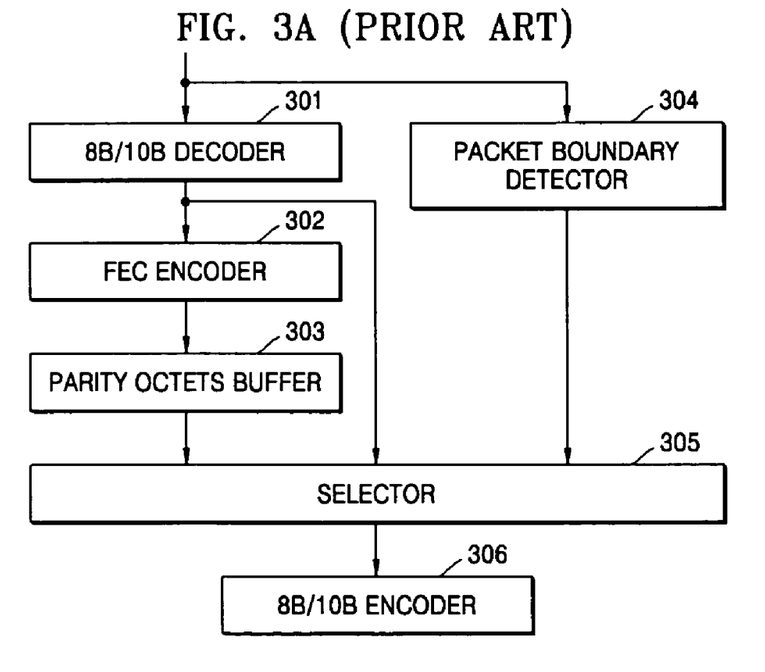
FIGS. 3A and 3B are block diagrams of a conventional EPON FEC transmitter and receiver, respectively.

As shown in FIG. 2, MAC/PHY (physical) layers of an EPON system comprise a MAC sublayer, a Reconciliation Sublayer (RS), a Physical Coding Sublayer (PCS), a FEC sublayer, a Physical Media Attachment (PMA) sublayer, and a Physical Media Dependent (PMD) sublayer. A FEC sublayer comprises a transmitter, a receiver, and a synchronous block. A transmitter is illustrated in FIG. 3A. A packet boundary detector 304 performs a boundary identification of an input 8B10B encoded frame from a PCS sublayer using a Ten Bit Interface (TBI). An 8B10B decoder 301 8B10B -decodes the frame into a data frame in byte units, and divides it into blocks in a unit of 239 bytes. A FEC encoder 302 Reed-Solomon-<239, 255, 8>-code-encodes data blocks divided in 239-bytes unit and generates parities composed of 16 bytes for the data blocks, respectively. A parity octets buffer 303 stores the generated parities.

Figure 4:
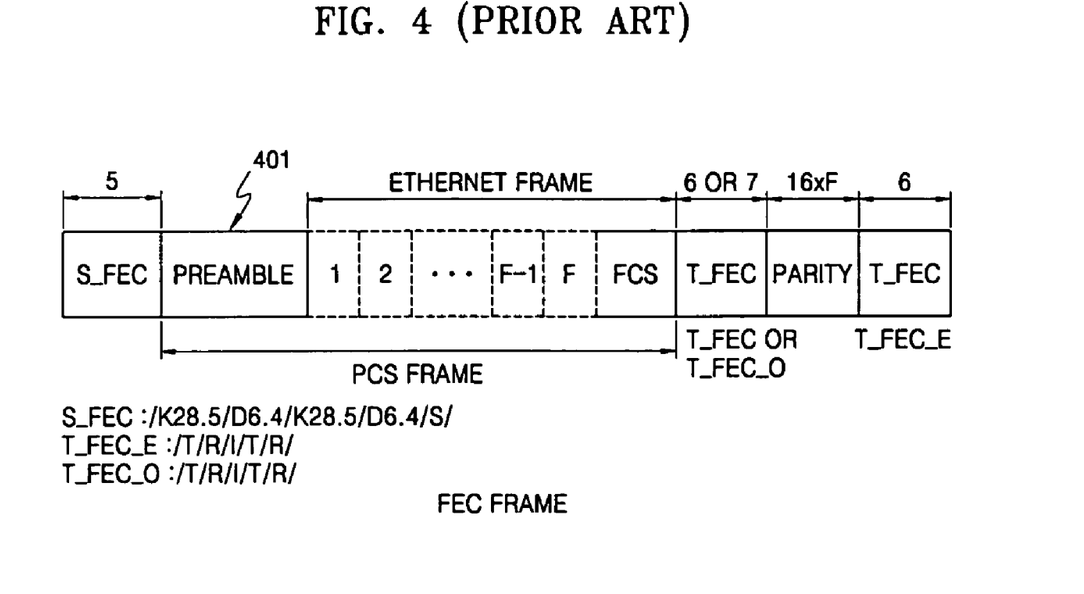
FIG. 4 is a diagram illustrating a conventional EPON FEC frame format.

A selector 305 selects one of the outputs of the 8B10B decoder 301 and the output of the FEC encoder 302 and transmits it to an 8B10B encoder 306. When the 8B10B encoder 306 8B10B-encodes the Reed-Solomon encoded data and the generated parities for output, frame identifiers are used to generate a FEC frame, which is transmitted to a PMA sublayer using the TBI, as shown in FIG. 4. The identifiers used to generate the FEC frame are S_FEC indicating the beginning of the frame, and T_FEC indicating the end of the frame. Referring to FIG. 4, S_FEC is equal to /K28.5/D/ K28.5/D/S, in which /K28.51D/K28.5/D/ is added to /S/, which is a Start Packet Delineator (SPD) indicating the beginning of a PCS frame. T_FEC has a /T/R/I/T/R or /T/R/R/I/T/ R, in which /I/T/R/ is added to /T/R/ or /T/R/R/, which is an End Packet Delineator (EPD) indicating the end of a PCS frame.

Figure 3B:
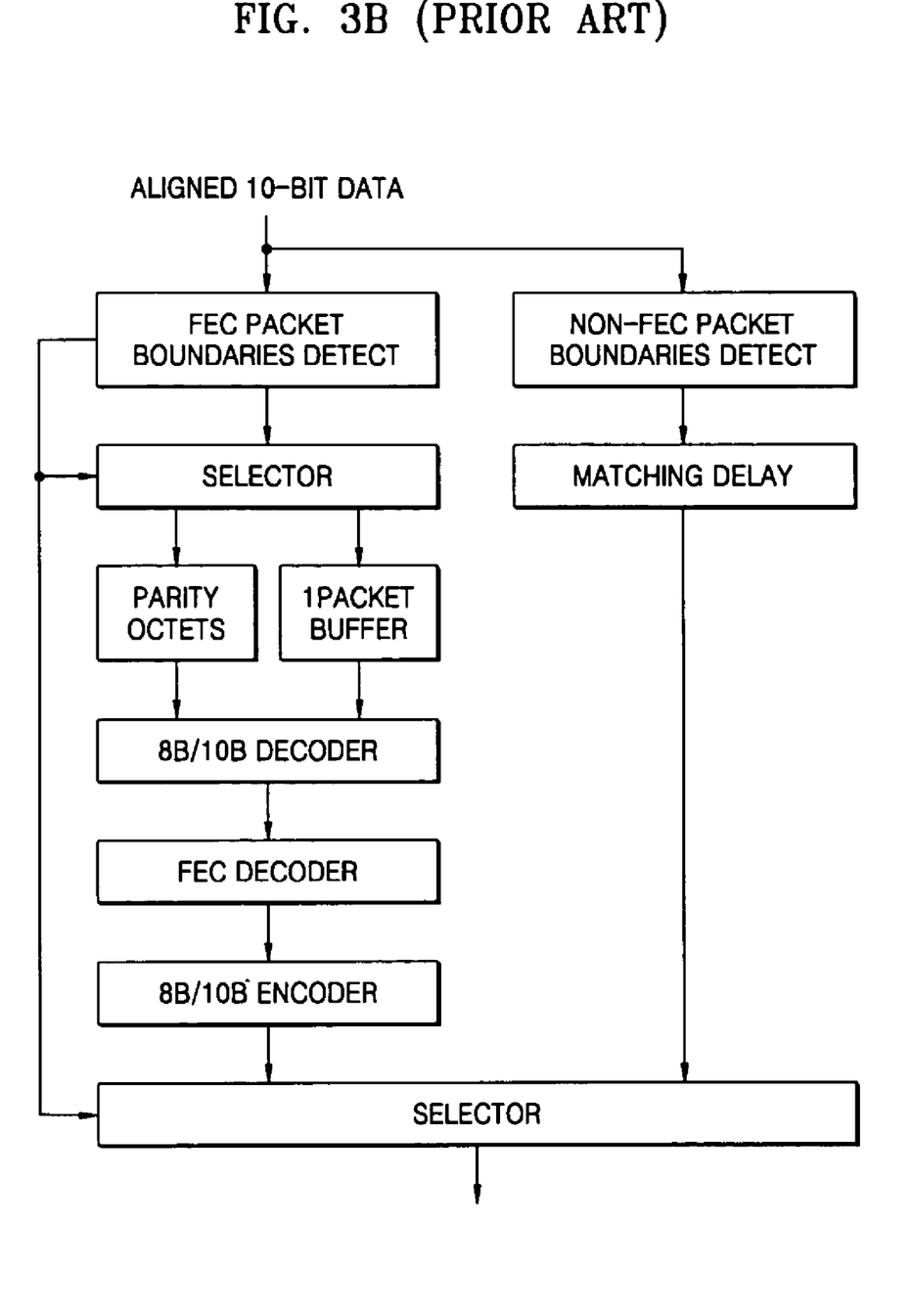

Both /K28.5/D/K28.5/D/ and /I/ indicate an IDLE codegroup, and are acknowledged as idle by the 8B10B encoder and decoder. As shown in FIG. 3B, a receiver identifies a boundary of an 8B10B frame using a synchronous block of an input 8B10B code-group received from a PMA sublayer using TBI, partitions Reed-Solomon code payload and parity data, 8B10B-decodes the Reed-Solomon code payload and parity data, and converts the decoded data into byte units. The identifiers used to generate the FEC frame are removed. Converted data having byte units are Reed-Solomon <239, 255, 8>-code decoded for correcting errors, and are transmitted to a PCS sublayer using the TBI after 8B10B encoding.

A parity byte is replaced with an IDLE code, which is decoded to a zero byte through the 8B10B decoder. When a receiver receives a frame that is not FEC encoded, the receiver detects a frame with a non-FEC packet boundary detect circuit, and transmits the frame to a PCS sublayer through a matching delay. A COMMA_DETECT signal input from a PMA sublayer results from the detection of COMMA from bit data received from a PMA sublayer and the re-configuring of an 8B10B code-group based on the location of the detected COMMA. The COMMA detect signal indicates a location of the COMMA to a FEC sublayer. The COMMA is k28.5, a special code in an 8B10B code-group which makes it possible to detect the beginning of a frame.

FEC adds a 16 byte parity, and identifiers such as S_FEC and T_FEC to blocks having 239 byte units in order to generate a FEC frame. Therefore, space should be made in FEC frame to insert the additional information, which is performed in MAC. Thus, a MAC stretches an Inter-Packet Gap (IPG) according to a frame size of transmitted data in order to add parity and identifiers.

Reed-Solomon <239, 255, 8> code used in a FEC sublayer adds 16 bytes of parity to 239 bytes of information data to generate a 255-byte code word, and corrects an error of the maximum 8 bytes in the 255-byte code word including the parity. Since Reed-Solomon <239, 255, 8> code includes 239 bytes of information data, a FEC sublayer divides an input data frame received from a PCS sublayer into 239-byte blocks in order to process a frame having a variable data length with a minimum length of 64 bytes and a maximum length of 1500 bytes such as an Ethernet frame. When a last block has less than 239 bytes, the last block is zero-padded.

The following three problems occur in FEC in an EPON system. First, an OLT has to use FEC when no ONU uses FEC, and an ONU has to use FEC when the ONU has initially used FEC. As a result, FEC overhead resulting from the added FEC identifiers and Reed-Solomon code parity, throughput is reduced 35% in data transmission over the Internet. Second, FEC of an ONU is not used when there are few ONUs and an optical link is good in an initial racing stage of EPON. Later when it is necessary to use FEC due to additional ONUs, a manager or a network provider must operate existing FECs of ONUs manually. Third, when an optical link is deteriorated while not using FEC, commencement of FEC causes a change in the RTT and an ONU has to go through discovery. Therefore, a method of controlling OLT and ONUs to monitor states of an optical link automatically and determine whether to use FEC is required.

Examples of conventional auto-negotiation methods used for Ethernet will now be described. For example, in U.S. Pat. No. 6,457,055 B1, entitled "Configuring Ethernet Devices", there is provided a method of allowing a linked device to acknowledge that a corresponding device supports a specified speed and in a user-specified transmission mode through auto-negotiation and to perform a data transmission at a user specified speed and transmission mode when a corresponding device is operated at a specific speed and transmission mode for a special reason such as a test or a limitation in design.

In U.S. Pat. No. 6,538,994 B1, entitled "Monitoring of Connection between an Ethernet HUB and an End Station", in an initial matching between an Ethernet HUB that supports a data transmission speed of 10 Mbps and 100 Mbps and an Ethernet device that supports an optional speed of 10 Mbps and 100 Mbps, when the HUB first transmits data at 100 Mbps and measures a code error of data received from a linked device, if the measured error exceeds a designated threshold value, the HUB determines that a linked device cannot support a transmission speed of 100 Mbps but only 10 Mbps and lowers a transmission speed to 10 Mbps.

In U.S. Pat. No. 5,809,249, entitled "System Having at Least One Auto-Negotiation Enabled Physical Media Dependent (PMD) Interface Device Operable to Perform Auto-Negotiation with Remote Link Partner on Behalf of All PMD", in an initial matching between a device having a plurality of different transmission physical layers and a linked device, besides a plurality of different transmission physical layers, an auto-negotiation enabled physical media dependent (NWAY PMD) functions as an auto-negotiation master, matches each transmission physical layer and a linked device, and transmits data using a transmission physical layer having a highest matching performance.

In U.S. Pat. No. 5,922,052 entitled "Fast Ethernet Combination Chaining of Auto-Negotiations for Multiple Physical Layer Capability", in an initial matching between a device having a plurality of different transmission physical layers and a linked device, without the assistance of an auto-negotiation physical layer, a device having a plurality of different transmission physical layers performs auto-negotiation with a linked device using a first transmission physical layer for matching. When matched, the corresponding transmission physical layer is used. When not matched, a next transmission physical layer is used to perform auto-negotiation again.

However, it is difficult to apply a conventional auto-negotiation method to an EPON system using a TDM transmission mode. As described above, an EPON system using a TDM transmission mode has to maintain RTT uniformly, and control a FEC operation according to a state of an optical link. Use of auto-negotiation in an EPON system requires a separate auto-negotiation channel, which cannot prevent a change in RTT and provide a method of measuring optical link quality.

SUMMARY OF THE INVENTION

The present invention provides a method of controlling effective FEC of an ONU and an OLT without changing an RTT based on optical link quality in which an ONU or an OLT that does not provide a FEC function and an ONU or an OLT that does provide a FEC function are matched.

According to an aspect of the present invention, there is provided a Forward Error Correction (FEC) frame used in data transmission between a transmitter and a receiver providing FEC, the FEC frame comprising: a frame start unit indicating the beginning of the FEC frame; a data unit including of a preamble of an Ethernet frame in Physical Coding Sublayer (PCS) frames in which a predetermined byte is allocated to a flag in order to control FEC; and a frame end unit indicating the end of the FEC frame.

According to another aspect of the present invention, there is provided a FEC encoder device of a FEC sublayer, comprising: a matching delay delaying a frame on which FEC encoding is not performed for a predetermined time and outputting the frame; and a selector receiving a FEC unencoded frame and a FEC encoded frame outputted from the matching delay and selectively outputting the frames.

According to still another aspect of the present invention, there is provided a method of controlling a FEC operation of an OLT, comprising: configuring a FEC frame to be transmitted between an OLT and an ONU comprising a FEC frame identifier indicating whether FEC should be performed, data, a first flag indicating that FEC should be performed, and a second flag indicating that the FEC frame is to be FEC encoded; initializing the OLT by disabling a FEC function; determining whether the ONU requires FEC to be performed based on a FEC frame identifier received from the ONU; performing IPG stretching when the ONU requires to FEC to be performed; and transmitting the FEC frame to the ONU after FEC encoding based on the second flag of an input frame to a PCS sublayer from an upper layer.

According to yet another aspect of the present invention, there is provided a method of controlling a FEC operation of an OLT with respect to a method of transmitting between the OLT and an ONU a FEC frame comprising a FEC frame identifier indicating whether FEC is to be performed, data, a first flag indicating that FEC is to be performed, and a second flag indicating that the FEC frame is to be FEC encoded, a third flag indicating that the FEC frame is an IPG stretched frame, the method comprising: when the ONU does not perform FEC, disabling the first and second flags and proceeding discovery with the OLT; when the ONU does perform FEC, disabling a data path from a PCS sublayer, and determining whether to perform an error monitoring according to whether to enable or disable a first flag of a frame received from the OLT; when the first flag of the frame received from the OLT is disabled, enabling the first flag of the frame transmitted to the OLT, enabling the data path; when the first flag of the frame received from the OLT is enabled, performing error monitoring; and when the error monitoring is performed, determining whether to use FEC based on a Bit Error Rate (BER), enabling the data path, and allowing the discovery.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

The present invention will now be described more fully with reference to the accompanying drawings.

Figure 6:
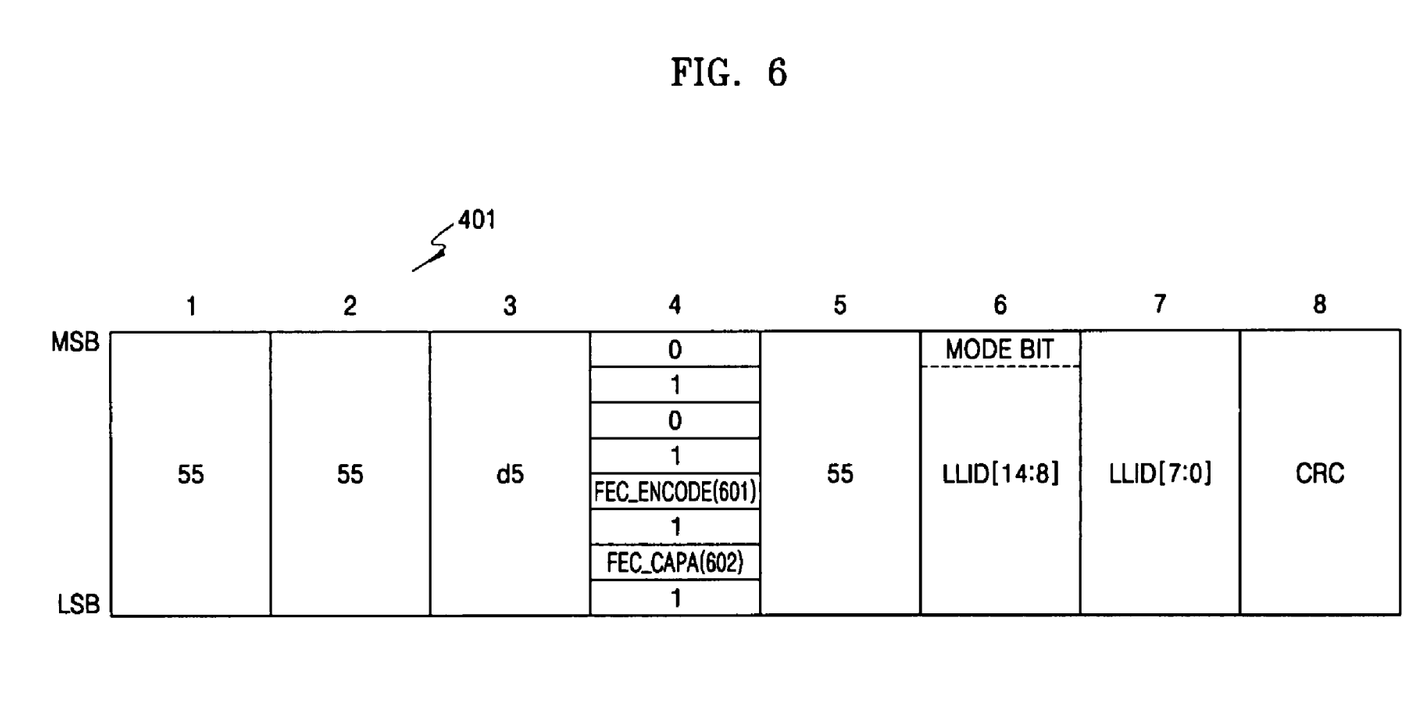
FIG. 6 is a diagram illustrating a preamble of an EPON frame according to an embodiment of the present invention.

FIG. 6 is a diagram illustrating a preamble of an EPON frame according to an embodiment of the present invention. Referring to FIG. 6, a fourth byte of the preamble of an Ethernet frame is used to effectively perform FEC between an OLT and an ONU. In the fourth byte of the preamble, a FEC_capa flag 602 indicates that the OLT or the ONU transmitting the present frame provides a FEC function, and a FEC-encode 601, which is set by a MPCP sublayer, indicates that the Ethernet frame requests a FEC transmitter encoder to FEC encode the present frame.

Fourth and fifth bytes of a conventional Ethernet frame each have a value of 0×55, in which a bit value is toggled in order to allow a linked receipt system to recover a clock. However, an EPON system performs an 8B10B encoding in advance to ensure that bits are toggled properly for a clock recovery. Therefore, the fourth and fifth bytes of the preamble having a value of 0×55 do not make a difference. A frame according to an embodiment of the present invention uses second and fourth bits of the fourth byte of the preamble to control a FEC operation. The use of the second and fourth bits makes it possible for the preamble to have the same form as a conventional Ethernet preamble when a flag is not used to control a FEC operation.

Figure 7:
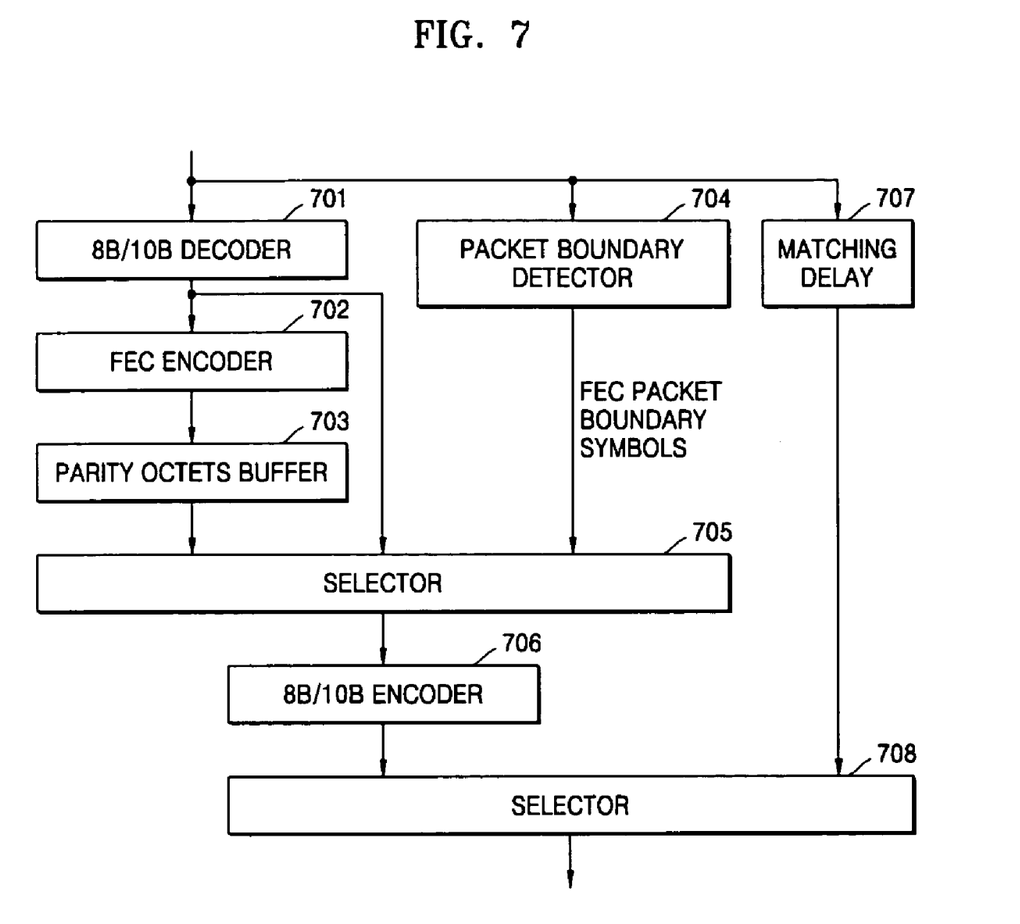
FIG. 7 is a block diagram of an EPON FEC transmitter according to an embodiment of the present invention.

FIG. 7 is a block diagram of an EPON FEC transmitter according to an embodiment of the present invention. Referring to FIG. 7, an 8B10B decoder 701, a FEC encoder 702, a parity octets buffer 703, a packet boundary detector 704, a selector 705, and an 8B10B encoder 706 function in the same manner as in FIG. 3, and thus their descriptions are not repeated. A FEC encoder device will be described with reference to FIG. 7. As shown in FIG. 7, a FEC sublayer transmitter further includes a matching delay 707 and provides a delay path in order to perform FEC encoding in input frames, such that a time delay difference between a FEC encoded frame and a FEC unencoded frame can be compensated for. The matching delayer 707 can selectively output a FEC encoded frame or a FEC unencoded frame using a selector 708.

In an EPON system, an OLT must be installed before an ONU and be in a normal state, keep transmitting an IDLE pattern when a link has no ONU, and simultaneously provide a discovery gate in order to register an ONU during a specified time interval. When more than one ONU is registered, the OLT always transmits data, an IDLE pattern, or a discovery gate, which are sure to be transferred to another ONU owing to a PON structure.

Figure 8A:
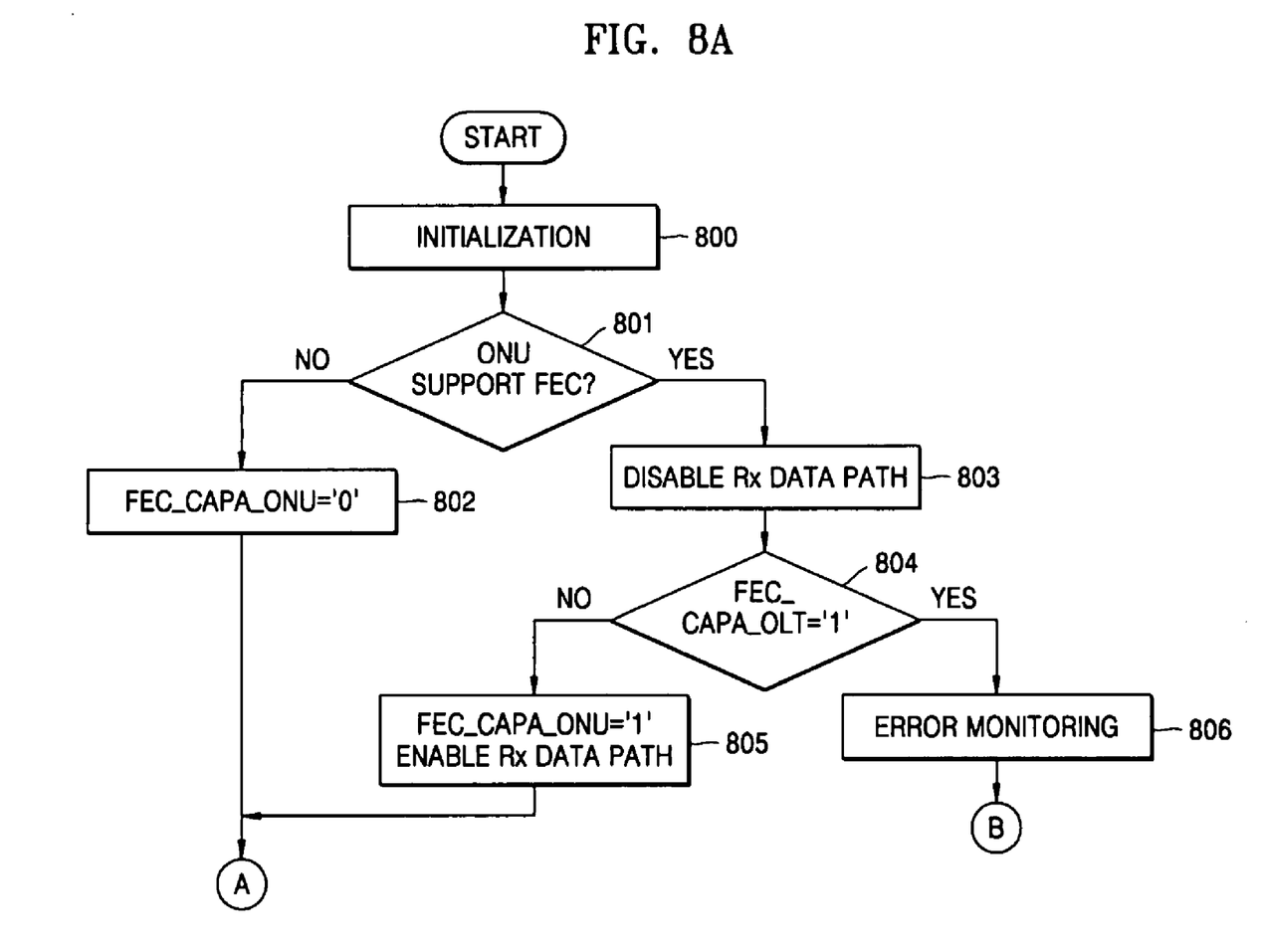
FIGS. 8A and 8B are flow charts illustrating a method of controlling a FEC operation according to an embodiment of the present invention.
Figure 8B:
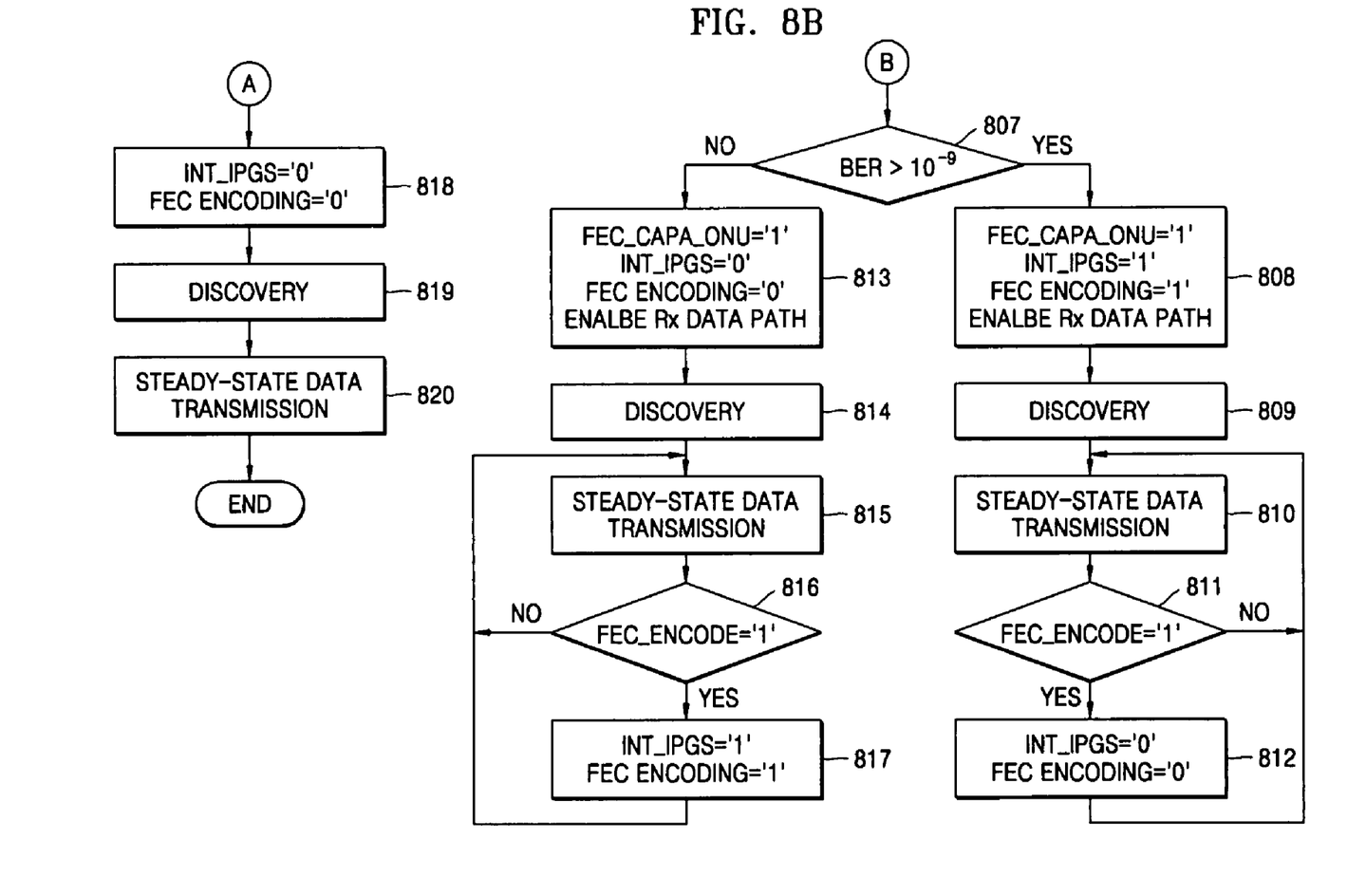

FIGS. 8A and 8B are flow charts illustrating a method of controlling a FEC operation including an initial process of ONU according to an embodiment of the present invention. Referring to FIGS. 8A and 8B, a method of controlling a FEC operation between an ONU and an OLT will now be described. An ONU is initialized by initial power-on including FEC in Operation 800, and waits for a discovery gate from the OLT for discovery after the initialization. The ONU must determine whether to perform FEC before a discovery. To this end, the ONU determines whether to perform FEC in Operation 801. If the ONU does not perform FEC, the ONU sets the FEC_encode 601 and the FEC_capa flag 602 to "0". The ONU sets INT_IPGS and FEC_encoding flag to "0", and proceeds discovery to start a data transmission in Operations 818 to 820.

Before the ONU performs FEC, the ONU disables a receipt data path to a PCS layer in order to disable discovery before determining whether to perform FEC in Operation 803. This does not allow a MAC of the ONU to receive data and proceed discovery.

After a receipt data path is disabled, a FEC sublayer examines a FEC_capa flag of a frame transmitted by the OLT, and determines whether the OLT provides a FEC function. When the OLT does not provide a FEC function, a FEC sublayer of the ONU sets a FEC_capa flag as "1", and enables a receipt data path to allow the ONU to proceed discovery in Operation 805. When the OLT does provide a FEC function, the FEC sublayer of the ONU starts error monitoring in order to determine a link state in Operation 806.

The FEC sublayer monitors an error by counting the number of bad code-groups of an 8B10B decoder. An 8B10B decoder generates the bad code-group when a received code-group is not in a designated code-group set, and locates an error of 1 bit. Therefore, when a link state is below $BER<10^{-1}$, an error of an 8B10B code-group can be stochastically determined to be a bit error, which can be located by an 8B10B decoder. Counting the number of bad code-groups produced by the 8B10B decoder for a predetermined period of time makes it possible to obtain a BER value similar to an actual BER value. For example, with respect to a 1Gb/s EPON, it is possible to determine BER over $10^{-9}$ on the average by counting the number of bad code-groups in the 8B10B decoder for 10 seconds. After the determination of BER, the FEC sublayer of the ONU can determine whether to use FEC. However, when the BER required in the 1Gb/s EPON is below $10^{-12}$, it is necessary to monitor a state of link for at least nine hours in order to measure $BER<10^{-12}$. It is impossible to monitor an error for such a length of time. According to an embodiment of the present invention, link quality is monitored based on $BER=10^{-9}$, a management block is used to monitor a more exact link quality, and to determine whether to perform FEC. An error is monitored only in the ONU due to downstream and upstream transmissions of data through the same optical link. Since a state of upstream link is usually worse than that of downstream due to the PON characteristics, BER less than $10^{-9}$ measured in the downstream link indicates a higher BER in the upstream link. So, in this case FEC needs to use.

The FEC sublayer of the ONU completes error monitoring and measures the BER in Operation 807. When $BER>10^{-9}$ and FEC operation is necessary, the FEC sublayer of the ONU sets INT_IPGS, an interrupt signal requiring an IPG stretching, to "1" in order to perform FEC and transmits the INT_IPGS to an upper layer in Operation 808. The FEC sublayer of the ONU is operated to discovery in Operation 809, and enables a receipt data path to transmit data received from the OLT to the PCS sublayer in Operation 810. During the data transmission, when the FEC_encode flag is "1" in Operation 811, the INT_IPGS and the FEC_encoding flag are set to "0" to transmit data again in Operation 812. An upper layer processes the INT_IPGS to set the FEC_enable flag of a frame generated thereafter to "1" in order to indicate that the frame is an IPG stretched frame for FEC. The FEC sublayer sets the FEC_capa flag of each frame to "1", and FEC-encodes frames in which the FEC_encode flag is set to "1" to transmit the frames.

When $BER<10^{-9}$ and FEC is not necessary, the FEC sublayer of the ONU enables a receipt data path to transmit data received from the OLT to the PCS sublayer, and sets the FEC_capa flag of a frame received from the upper layer to "1" to transmit data in Operations 813 through 815. During the data transmission, when the FEC_encode flag is "1" in Operation 816, the FEC_encoding flag is set to "1" to transmit data again in Operation 817.

When the FEC sublayer of the OLT provides a FEC function in the initialization process along with an initial power-on, FEC_capa="1". When the FEC sublayer of the OLT does not provide a FEC function in the initialization process, FEC_capa="0", and FEC_encode flag is "0" in order to not perform FEC. While FEC is not initially performed, if the ONU that is registered through discovery must perform FEC, the FEC sublayer of the OLT sets INT_IPGS to "1" to allow an upper layer to IPG stretch. When a FEC_encode flag of a transmission frame received from an upper layer is set to "1", a FEC sublayer of OLT FEC-encodes and transmits the frame.

A receiver of the FEC sublayer searches an identifier of a frame transmitted by the ONU and received by the OLT in order to determine the FEC requirement from the frame. As described above, a FEC frame includes S_FEC and T_FEC as identifiers, and a non-FEC frame includes SPD and EPD as identifiers. Therefore, the FEC receiver examines a start identifier of a received frame, and determines the received frame to be as a FEC frame when the start identifier is S_FEC and determines the received frame to be a non-FEC frame when the start identifier is SPD.

The ONU and the OLT determine whether to perform FEC according to a link state before an initial discovery. When the link state is $10^{-12}<BER<10^{-9}$, FEC must be performed if required by the EPON system. However, it is impossible to determine whether FEC must be performed in an initial discovery due to an excessive time required for error monitoring. A measure is not prepared for the case where a link state becomes better while FEC is performed, it is not necessary to perform FEC any more.

According to an embodiment of the present invention, an encoder and a decoder of a FEC sublayer can encode and decode in frame units. Therefore, when a FEC is stopped to perform, or must be performed again during data transmission between an ONU and an OLT in a normal state, a FEC_enable flag is set to "1" when generating a frame in an upper layer.

Whether to use an error correction code to increase budget of a link is determined according to a link state. Whether a linked system uses an error correction code during the data transmission between the ONU and the OLT is confirmed. The ONU and the OLT determine link quality for an initial period of time, determine whether to use an error correction code, and determine whether a linked system must use an error correction code by means of a specific flag of a frame. Therefore, a data transmission delay and a transmission throughput decrease thereof due to a unilateral use of an error correction code can be reduced and power consumption can be reduced.

It is possible for the present invention to be realized on a computer-readable recording medium as a computer-readable code. Computer-readable recording mediums include every kind of recording device that stores computer systemreadable data. ROMs, RAMS, CD-ROMs, magnetic tapes, floppy discs, optical data storage, etc. are used as a computer-readable recording medium.

As described above, in the method of controlling the FEC of an ONU and an OLT, an RTT is not changed according to optical link quality in an EPON, and accordingly, FEC is only used if necessary, thereby managing a link easily, and preventing an excessive reduction of 35% of throughput caused by unnecessary use of FEC.

The method of controlling FEC is used to increase power budget of an optical link and increase the transmission distance and the number of optical nodes in an EPON system according to a state of an optical link, thereby effectively increasing throughput and reducing FEC overhead and power consumption.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a Forward Error Correction (FEC) operation of an OLT, comprising:
    configuring a FEC frame to be transmitted between an OLT and an ONU, said FEC frame comprising data, a first flag indicating that FEC encoding is to be provided, and a second flag requiring the OLT and the ONU to encode the FEC frame;
    determining, at the ONU, whether FEC encoding is required based on a FEC frame identifier received from the OLT;
    performing IPG stretching at the ONU when FEC encoding is required; and
    transmitting the FEC frame to the ONU after FEC encoding based on the second flag of the FEC frame to a physical coding sublayer from an upper layer.

2. The method of claim 1, wherein the IPG stretching comprises:
    setting an interrupt signal; and
    enabling the first flag and indicating that the IPG stretching has been performed.

3. The method of claim 1, wherein the IPG stretching further comprises:
    stretching the IPG in frames and enabling the second flag of the IPG stretched FEC frame.

4. A method of controlling a Forward Error Correction (FEC) operation of an OLT with respect to transmitting between the OLT and an ONU a FEC frame comprising data, a first flag indicating that FEC encoding is to be provided, and a second flag requiring the OLT and the ONU to encode the FEC frame, a third flag indicating that the FEC frame is an IPG stretched frame, the method comprising:
    when the ONU does not perform FEC encoding, the ONU disabling the first and the second flags and proceeding discovery with the OLT;
    when the ONU does perform FEC encoding, the ONU disabling a data path to a physical coding sublayer, and determining whether to perform an error monitoring according to a state of a first flag of a frame received from the OLT, said state being one of enabled and disabled;
    when the first flag of the frame received from the OLT is disabled, enabling, at the ONU, the first flag of the frame transmitted to the OLT, enabling the data path;
    when the first flag of the frame received from the OLT is enabled, performing error monitoring at the ONU; and
    when the error monitoring is performed, determining, at the ONU, whether to use FEC encoding based on a Bit Error Rate (BER), enabling the data path, and allowing the discovery.

5. The method of claim 4, wherein the determining whether to use FEC encoding comprises:
    using the FEC encoding when the BER is greater than a predetermined threshold value, and not using the FEC encoding when the BER is less than the predetermined threshold value.

6. The method of claim 5, wherein the BER is estimated by counting a number of bad code-groups in a code-group received from the OLT.

7. The method of claim 4, further comprising:
    when it is determined to use the FEC encoding, a FEC sublayer requiring the upper layer for the IPG stretching, enabling the data path, and transferring data received from the OLT to the upper layer;
    enabling the third flag and indicating that the upper layer performs the IPG stretching; and
    a FEC sublayer enabling a first flag of the frame, performing FEC encoding on a frame in which the second flag is enabled, and transmitting the FEC encoded frame to the OLT.

8. The method of claim 7, further comprising:
    when it is determined not to use the FEC encoding, enabling the data path, enabling only the first flag of a frame received from the upper layer, and transmitting the frame to the OLT.

9. The method of claim 7, wherein the upper layer performing the IPG stretching in frames and operates the FEC encoding in frames.

* * * * *